(12) United States Patent
Scheer et al.

(10) Patent No.: US 12,233,684 B2
(45) Date of Patent: Feb. 25, 2025

(54) CONTROL OF THE TEMPERATURE IN THE INTERIOR OF A VEHICLE

(71) Applicant: Ford Global Technologies, LLC, Dearborn, MI (US)

(72) Inventors: Volker Scheer, Roetgen (DE); Klaus Schuermanns, Cologne (DE); Bernd Dienhart, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 273 days.

(21) Appl. No.: 17/937,200

(22) Filed: Sep. 30, 2022

(65) Prior Publication Data

US 2023/0100673 A1    Mar. 30, 2023

(30) Foreign Application Priority Data

Sep. 30, 2021    (DE) .......................... 102021125409.4

(51) Int. Cl.
*B60H 1/00*    (2006.01)
(52) U.S. Cl.
CPC ............................... *B60H 1/00807* (2013.01)

(58) Field of Classification Search
CPC ............ B60H 1/00742; B60H 1/00807; B60H 1/2215; B60H 1/00735; B60N 2/5628; Y02T 10/88
See application file for complete search history.

(56) References Cited

U.S. PATENT DOCUMENTS

| 10,675,944 B2 | 6/2020 | Takeda et al. |
| 2018/0251007 A1* | 9/2018 | Neveu ................ B60H 1/00742 |
| 2020/0290430 A1* | 9/2020 | Neveu .................... G01J 5/0003 |

FOREIGN PATENT DOCUMENTS

| CN | 108725136 A | 11/2018 | |
| JP | 5103767 B2 | 12/2012 | |
| JP | 2020063029 A | 4/2020 | |
| WO | WO-2019053360 A1 * | 3/2019 | ......... B60H 1/00735 |

* cited by examiner

*Primary Examiner* — Frantz F Jules
*Assistant Examiner* — Martha Tadesse
(74) *Attorney, Agent, or Firm* — Frank Lollo; Eversheds Sutherland (US) LLP

(57) ABSTRACT

A method for controlling a temperature in an interior of a vehicle is provided, wherein the temperature in the vehicle interior is determined with the aid of infrared radiation emitted by the fitments or in the interior, and the air conditioning is adjusted accordingly. A vehicle which is configured to carry out the method is furthermore provided.

12 Claims, 2 Drawing Sheets

CONTROL OF THE TEMPERATURE IN THE INTERIOR OF A VEHICLE

CROSS-REFERENCE TO RELATED PATENT APPLICATION

The present application claims priority to and the benefit of German Application No. DE102021125409.4, filed Sep. 30, 2021, which is hereby incorporated by reference herein its entirety.

FIELD OF THE INVENTION

The disclosure relates to a method for controlling the temperature in the interior of a vehicle and to a vehicle for carrying out the method.

BACKGROUND

Air conditioning systems in vehicles have particular functions to fulfill, for example heating and cooling the vehicle interior or window deicing. In addition, modern air conditioning systems have functions such as controlling the temperature and humidity in the vehicle interior, or in various zones of the vehicle interior, controlling the air temperature and the air circulation in the vehicle interior, compensating for solar irradiation, automatic fog detection and optimization of the energy consumption. For this purpose, the air conditioning system is connected to a range of sensors, for example temperature sensors, humidity sensors, solar radiation sensors, fog sensors, and the like.

In an automatic mode, an occupant of the vehicle selects a temperature setting, for example, according to which a corresponding temperature is provided in the vehicle usually within a short period of time. In this case, the adjusted temperature is intended to be maintained throughout the journey. Varying external parameters, for example solar irradiation, vehicle speed, driving through tunnels and precipitation in this case need to be compensated for by the air conditioning system without the comfort of the vehicle occupants suffering. In order to ensure corresponding comfort, it is necessary to provide sensor values and complex programs for evaluating the sensor values and calibrating the flow, distribution and temperature of air inside the vehicle. For each vehicle, the values need to be reselected for each journey. In this case, adjustments by vehicle occupants and automatic calibration by the air conditioning system may sometimes have different effects, which may lead to lack of comfort for the occupants.

In order to control the conditions in the vehicle interior more efficiently, there are approaches from many manufacturers to detect the heat radiated by vehicle occupants. The radiated heat, besides other parameters, is then used as an input value in order to evaluate the individual comfort of occupants and to readjust the settings of the air conditioning system if appropriate (WO 2017/041 921 A1, US 2012/312 520 A1, US 2011/172 880 A1).

Conventional approaches, however, always presuppose the presence of vehicle occupants.

BRIEF DESCRIPTION OF THE DRAWINGS

The disclosure will be explained in more detail with the aid of the figures, in which.

DETAILED DESCRIPTION

Figure 1:
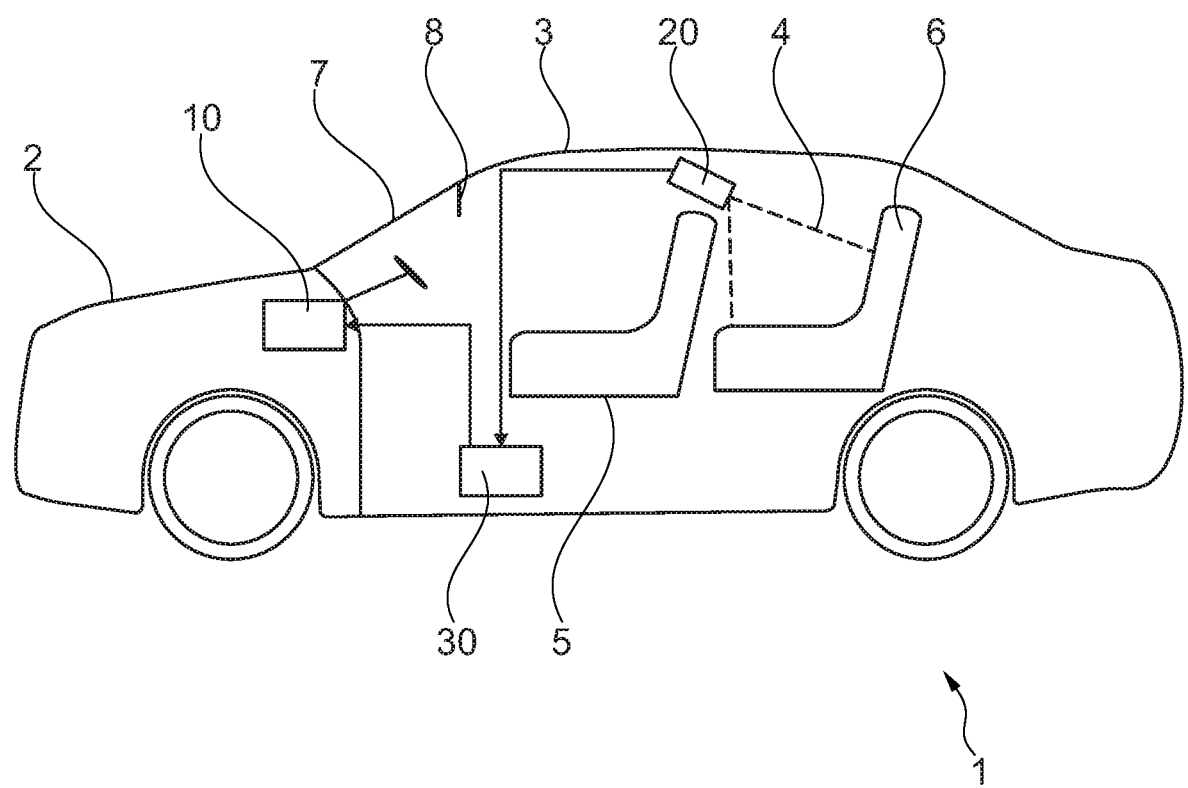
FIG. 1 shows a schematic representation of a vehicle according to the disclosure.

An object of the present disclosure is to control the air conditioning in a vehicle interior independently of vehicle occupants. This object may be achieved by a method according to claim 1 and a vehicle according to claim 8. Further advantageous configurations and embodiments of the disclosure may be found in the dependent claims, the figures and the exemplary embodiment. The embodiments of the disclosure may advantageously be combined with one another.

A first aspect of an embodiment of the disclosure relates to a method for controlling a temperature inside an interior of a vehicle with at least an air conditioning system, a camera and a control device, having the steps:
  examining the interior in respect of whether at least one region of the interior fitments in the interior can be acquired by the camera,
  determining the temperature in at least a part of the interior by means of the camera by measuring infrared radiation, correlated with the temperature, in the region of a surface of the interior fitments or by recording an average infrared value inside the interior by means of the camera, if the interior fitments cannot be detected,
  determining at least one average temperature inside the vehicle interior,
  transmitting the average value to the air conditioning system.

The method according to an embodiment of the disclosure advantageously makes it possible to establish the temperature in the vehicle interior on the basis of surface temperatures of fitment objects in the vehicle interior. If identification of objects in the vehicle interior is not possible, for example if the camera is obscured, the temperature of pixels may be used.

The method permits automatic control of an air conditioning system even under conditions in which there is no person in the vehicle or the occupant tracking is not functioning. The efficiency of the corresponding air conditioning system is therefore improved in comparison with conventional methods for controlling an air conditioning system. Furthermore, the method is usable even in the event of deliberate or unintentional obscuring or deactivating of the camera. The method also makes it possible to detect open windows or an open vehicle roof.

Preferably, for the measured surface temperature, an average value of the relevant surface and an average value of all the values measured by the camera are calculated, and the average values are weighted. The use of average values of the temperature is advantageous particularly in the case of a plurality of measurement values of a surface.

Preferably, the measured or calculated values are set in relation with a reference value for the surface temperature, and the thermal radiation of the relevant surface is calculated. The use of a reference value presupposes that a reference region, for example the surface of a vehicle seat, is known.

Preferably, the temperature values of different surface regions are used as input data, in order, with an assumption of an average distance from a vehicle occupant, to relate the thermal radiation to the vehicle occupants.

For a case in which no interior fitment is identified, the average value obtained is compared with an earlier stored average value and the current value of the temperature is decided on from this comparison. The decision is carried out with the assumption of a certain tolerance range of errors in the temperature determination.

Preferably, the value transmitted to the control device is selected from the group consisting of measured temperature values, surface temperature fields, thermal radiation fields and the error status.

Preferably, the control device calculates a comfort status in the interior on the basis of the thermal radiation. The air conditioning system automatically adjusts the temperature and air flow in the interior according to the calculations.

A second aspect relates to a vehicle comprising at least an air conditioning system, a camera and a control device, which is configured to control a method according to the disclosure. The advantages of the vehicle correspond to the advantages of the method according to the disclosure. The vehicle is in particular a motor vehicle, although it may also be a watercraft or aircraft.

With reference to the figures, a motor vehicle 1 according to the disclosure is configured in an embodiment according to FIG. 1 as a saloon car. The motor vehicle 1 comprises an interior 4 delimited by a body 2 and a roof 3. The interior 4 may also synonymously be referred to as a passenger compartment. Interior fitments, which comprise two front seats 5 and a rear bench seat 6, are arranged in the interior 4. Further elements of the interior fitments are for example various furnishings, control elements, mirrors, safety belts, etc.

The motor vehicle 1 has an air conditioning system 10. The air conditioning system 10 is configured to control temperature, humidity, air flow and other parameters which are familiar to the person skilled in the art in the interior 4.

A camera 20 may be arranged in the region of the roof 3. The camera 20 may be configured as an infrared light camera. The camera 20 can therefore detect heat radiated by objects of the interior fitments by measuring the infrared radiation. Reflective panels, which reflect infrared radiation, may be arranged in the interior 4.

The camera 20 is arranged in such a way that it can acquire at least the thermal radiation of the front seats 5 and of the bench seat 6. In this case, the camera 20 in FIG. 1 is located in the middle of the roof 3, that is to say equally far away from all the edges of the roof. As an alternative, the camera 20 may also be arranged in the region of a rear-view mirror 8 arranged centrally above the boundary of the windscreen 7 or at another practicable position in the interior 4. A plurality of cameras may also be arranged in the interior 4 in order to fully acquire the thermal radiation in the interior 4.

The camera 20 may be connected to a control device 30. The control device 30 may be configured to receive sensor values from the camera 20 and to calculate what the temperature distribution is in individual regions of the interior 4 and in the interior 4 as a whole. The control device 30 may be furthermore configured to calculate settings of devices of the air conditioning system 10 which are intended for temperature regulation, and to transmit corresponding control instructions to the air conditioning system 10. The control device 30 can have correspondingly designed computer hardware, processor, memory and/or software components for implementing the described tasks and functions. For instance, the processor may execute software to provide the described tasks and functions described herein.

Figure 2:
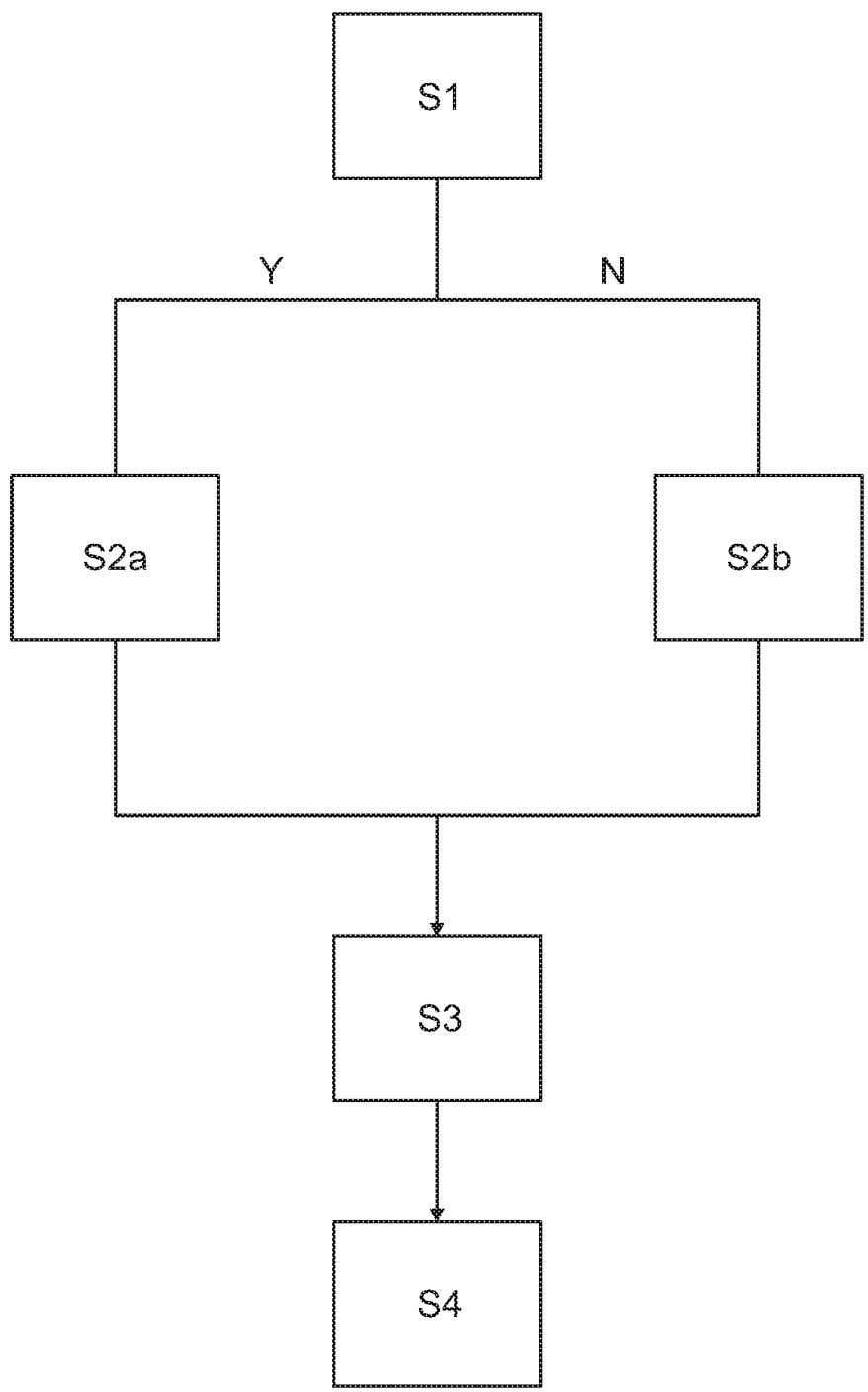
FIG. 2 shows a flowchart of a method according to the disclosure.

In an embodiment of a method for controlling a temperature in the interior 4 of the motor vehicle 1, according to the flowchart in FIG. 2, in a first step S1 the interior 4 is examined in respect of whether at least a part of the interior fitments in the interior 4, namely the seats 5 and the bench seat 6, can be acquired by the camera 20.

As a function of the possibility of detecting the interior fitments, the method locally runs in two branches. If the seats 5 and/or the bench seat 6 can be detected (Y for Yes), in a second step S2a measurements are recorded by means of the camera 20 by measuring infrared radiation, correlated with the temperature, in the region of a surface of the seats 5 and the bench seat 6, and these measurement values are transmitted to the control device 30.

If no part of the interior fitments can be detected by the camera 20 (N for No), for example because the eyepiece of the camera 20 is obscured, in a second step S2b temperature values are determined by recording an average infrared value inside the interior 4.

In a third step S3, at least one average value of the temperature values determined is calculated by the control device 30. For this purpose, after step S2a, an average temperature of an examined surface of the seats 5 or the bench seat 6 as well as an average temperature of all sensor values in the field of view of the camera 20 are measured and the values are weighted against one another. As an alternative or in addition, a reference temperature of an examined surface may be determined and used in order to calculate the thermal radiation of the surface.

After step S2b, in step S3, the average temperature determined in step S2b is compared with one (or more) average temperatures determined at an earlier time and a current value is decided on. In this case, a certain error range is taken into account.

In a fourth step S4, the determined average temperature, thermal images and thermal radiation of analyzed surfaces as well as error ranges are transmitted to the air conditioning system 10. In the air conditioning system 10, the corresponding switching points are operated in order to adjust the temperature in the interior 4 of the vehicle 1 on the basis of the values that have been determined.

LIST OF REFERENCES 1 motor vehicle
2 body
3 roof
4 interior
5 front seats
6 rear bench seat
7 windscreen
8 rear-view mirror
10 air conditioning system
20 camera
30 control device

The invention claimed is:

1. A method for controlling a temperature inside an interior of a vehicle with at least an air conditioning system, a camera and a control device, comprising the steps: determining, at a first time, that the camera is unobstructed and able to detect at least one region of one or more interior fitments in the interior of the vehicle; determining, based on infrared radiation detected by the camera, one or more surface temperatures of the one or more interior fitments in the interior of the vehicle; calculating a first comfort status in the interior of the vehicle based on the one or more surface temperatures; automatically adjusting temperature and air flow in the interior of the vehicle according to the first comfort status; determining, at a second time, that the camera is obstructed and unable to detect the one or more interior fitments; determining, based on determining that the one or more interior fitments are unable to be detected, at least one average temperature inside the vehicle interior instead of the surface temperature; transmitting the average temperature to the air conditioning system; calculating a second comfort status in the interior of the vehicle based on the average temperature inside the vehicle interior; and automatically adjusting temperature and air flow in the interior of the vehicle according to the second comfort status.

2. The method according to claim 1, wherein for the one or more surface temperatures, an average value of the relevant surface and an average value of all the values measured by the camera are calculated, and the average values are weighted.

3. The method according to claim 1, wherein the measured or calculated values are set in relation with a reference value for the one or more surface temperatures, and the thermal radiation of a relevant surface is calculated.

4. The method according to claim 1, wherein the temperature values of different surface regions are used as input data, in order, with an assumption of an average distance from a vehicle occupant, to relate the thermal radiation to the vehicle occupants.

5. The method according to claim 1, wherein the average value obtained is compared with an earlier stored average value and a current value is identified therefrom.

6. The method according to claim 1, wherein the value transmitted to the control device is selected from the group consisting of measured temperature values, surface temperature fields, thermal radiation fields and error status.

7. A vehicle comprising at least an air conditioning system, a camera and a control device, which is configured to execute the following steps: determine, at a first time, that the camera is unobstructed and able to detect at least one region of one or more interior fitments in an interior of the vehicle; determine, based on infrared radiation detected by the camera, one or more surface temperatures of the one or more interior fitments of the interior of the vehicle; calculate a first comfort status in the interior of the vehicle based on the one or more surface temperatures; automatically adjust temperature and air flow in the interior of the vehicle according to the first comfort status; determining, at a second time, that the camera is obstructed and unable to detect the one or more interior fitments; determine, based on determining that the one or more interior fitments are unable to be detected, at least one average temperature inside the vehicle interior instead of the surface temperature; transmit the average temperature to the air conditioning system; calculate a second comfort status in the interior of the vehicle based on the average temperature inside the vehicle interior; and automatically adjust temperature and air flow in the interior of the vehicle according to the second comfort status.

8. The vehicle according to claim 7, wherein for the measured surface temperature, an average value of a relevant surface and an average value of all the values measured by the camera are calculated, and the average values are weighted.

9. The vehicle according to claim 7, wherein the measured or calculated values are set in relation with a reference value for the surface temperature, and the thermal radiation of the relevant surface is calculated.

10. The vehicle according to claim 7, wherein the temperature values of different surface regions are used as input data, in order, with an assumption of an average distance from a vehicle occupant, to relate the thermal radiation to the vehicle occupants.

11. The vehicle according to claim 7, wherein the average value obtained is compared with an earlier stored average value and the current value is identified therefrom.

12. The vehicle according to claim 7, wherein the value transmitted to the control device is selected from the group consisting of measured temperature values, surface temperature fields, thermal radiation fields and error status.

* * * * *